(12) United States Patent
Hanna

(10) Patent No.: US 6,259,467 B1
(45) Date of Patent: Jul. 10, 2001

(54) MULTI STAGE OSCILLATOR PHASE ALIGNMENT SCHEME

(75) Inventor: Stephen D. Hanna, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/248,086

(22) Filed: Feb. 9, 1999

(51) Int. Cl.[7] .................................................. B41J 2/435
(52) U.S. Cl. ........................ 347/249; 347/235; 347/248
(58) Field of Search .................................. 347/235, 234, 347/248, 249, 247, 237; 329/325, 346

(56) References Cited

U.S. PATENT DOCUMENTS

| 5,081,477 | 1/1992 | Gibson | 347/133 |
|---|---|---|---|
| 5,438,353 | 8/1995 | Morrison | 347/250 |
| 5,485,195 | * 1/1996 | Nacman | 347/247 |
| 5,606,648 | 2/1997 | Walther et al. | 358/1.7 |

* cited by examiner

Primary Examiner—N. Le
Assistant Examiner—Hai C. Pham
(74) Attorney, Agent, or Firm—Blakely, Sokoloff, Taylor & Zafman LLP

(57) ABSTRACT

A method and apparatus for signal phase alignment. A pulse is produced and a reference clock signal having a first frequency with one or more clock edges is produced. An alignment clock signal is generated having the first frequency aligned with the pulse. The first frequency of the alignment clock signal is then realigned with the pulse. The alignment clock signal is generated using the pulse and aligning one of the clock edges of the reference clock signal with the pulse edge. The alignment clock signal is realigned using a plurality of delayed clock signals based on the reference clock signal. Each of the delayed clock signals has one or more edges. The plurality of delayed clock signals are latched based on the pulse and the delayed clock signal having an edge nearest to the pulse is selected.

14 Claims, 8 Drawing Sheets

|   | 1 | 2 | 3 | 4 | 5 | 6 | 7 | 8 | 9 | 0 |     |               |             |
|---|---|---|---|---|---|---|---|---|---|---|-----|---------------|-------------|
| A | 0 | 0 | 0 | 0 | 0 | 0 | 0 | 0 | 0 | 0 | "00"| OUTSIDE RANGE | PELCLK = CLK1 |
| B | 1 | 0 | 0 | 0 | 0 | 0 | 0 | 0 | 0 | 0 | "11"| TARGET RANGE  | PELCLK = CLK1 |
| B | 1 | 1 | 0 | 0 | 0 | 0 | 0 | 0 | 0 | 0 | "11"| TARGET RANGE  | PELCLK = CLK2 |
| B | 1 | 1 | 1 | 0 | 0 | 0 | 0 | 0 | 0 | 0 | "11"| TARGET RANGE  | PELCLK = CLK3 |
| B | 1 | 1 | 1 | 1 | 0 | 0 | 0 | 0 | 0 | 0 | "11"| TARGET RANGE  | PELCLK = CLK4 |
| B | 1 | 1 | 1 | 1 | 1 | 0 | 0 | 0 | 0 | 0 | "11"| TARGET RANGE  | PELCLK = CLK5 |
| B | 1 | 1 | 1 | 1 | 1 | 1 | 0 | 0 | 0 | 0 | "11"| TARGET RANGE  | PELCLK = CLK6 |
| B | 1 | 1 | 1 | 1 | 1 | 1 | 1 | 0 | 0 | 0 | "11"| TARGET RANGE  | PELCLK = CLK7 |
| B | 1 | 1 | 1 | 1 | 1 | 1 | 1 | 1 | 0 | 0 | "11"| TARGET RANGE  | PELCLK = CLK8 |
| B | 1 | 1 | 1 | 1 | 1 | 1 | 1 | 1 | 1 | 0 | "11"| TARGET RANGE  | PELCLK = CLK9 |
| C | 1 | 1 | 1 | 1 | 1 | 1 | 1 | 1 | 1 | 1 | "00"| OUTSIDE RANGE | PELCLK = CLK1 |
| D | 0 | 1 | 1 | 1 | 1 | 1 | 1 | 1 | 1 | 1 | "00"| OUTSIDE RANGE | PELCLK = CLK1 |
| D | 0 | 0 | 1 | 1 | 1 | 1 | 1 | 1 | 1 | 1 | "00"| OUTSIDE RANGE | PELCLK = CLK1 |
| D | 0 | 0 | 0 | 1 | 1 | 1 | 1 | 1 | 1 | 1 | "00"| OUTSIDE RANGE | PELCLK = CLK1 |
| D | 0 | 0 | 0 | 0 | 1 | 1 | 1 | 1 | 1 | 1 | "00"| OUTSIDE RANGE | PELCLK = CLK1 |
| D | 0 | 0 | 0 | 0 | 0 | 1 | 1 | 1 | 1 | 1 | "00"| OUTSIDE RANGE | PELCLK = CLK1 |
| D | 0 | 0 | 0 | 0 | 0 | 0 | 1 | 1 | 1 | 1 | "00"| OUTSIDE RANGE | PELCLK = CLK1 |
| D | 0 | 0 | 0 | 0 | 0 | 0 | 0 | 1 | 1 | 1 | "00"| OUTSIDE RANGE | PELCLK = CLK1 |
| D | 0 | 0 | 0 | 0 | 0 | 0 | 0 | 0 | 1 | 1 | "00"| OUTSIDE RANGE | PELCLK = CLK1 |
| D | 0 | 0 | 0 | 0 | 0 | 0 | 0 | 0 | 0 | 1 | "00"| OUTSIDE RANGE | PELCLK = CLK1 |

FIG. 5A

| | |
|---|---|
| ALL TYPE A | "00" OUTSIDE RANGE |
| ALL TYPE B | "11" TARGET RANGE |
| ALL TYPE C | "00" OUTSIDE RANGE |
| ALL TYPE D | "00" OUTSIDE RANGE |
| MIX OF TYPE A,B | "10" EARLY |
| MIX OF TYPE A,C | "00" OUTSIDE RANGE (INVALID) |
| MIX OF TYPE A,D | "00" OUTSIDE RANGE |
| MIX OF TYPE B,C | "01" LATE |
| MIX OF TYPE B,D | "00" OUTSIDE RANGE (INVALID) |
| MIX OF TYPE C,D | "00" OUTSIDE RANGE |
| MIX OF TYPE A,B,C | "00" OUTSIDE RANGE (INVALID) |
| MIX OF TYPE A,B,D | "00" OUTSIDE RANGE (INVALID) |
| MIX OF TYPE A,C,D | "00" OUTSIDE RANGE (INVALID) |
| MIX OF TYPE B,C,D | "00" OUTSIDE RANGE (INVALID) |
| MIX OF TYPE A,B,C,D | "00" OUTSIDE RANGE (INVALID) |

FIG. 5B

| | |
|---|---|
| MIX OF "00" & "10" | "10" EARLY |
| MIX OF "00" & "01" | "10" LATE |
| MIX OF "11" & "10" | "10" EARLY |
| MIX OF "11" & "01" | "10" LATE |
| ALL "00" | "11" OUTSIDE RANGE |
| ALL "11" | "11" TARGET RANGE |
| ALL "10" | "11" EARLY |
| ALL "01" | "11" LATE |
| ANY OTHER MIX | "00" OUTSIDE RANGE (INVALID) |
| ANY OTHER MIX | SETS INVALID RANGE ERROR AS WELL |

FIG. 5C

MULTI STAGE OSCILLATOR PHASE ALIGNMENT SCHEME

FIELD OF THE INVENTION

This invention relates to the field of electrophotographic reproduction devices and, more specifically, to alignment of signals used in electrophotographic reproduction devices.

BACKGROUND

Electrophotographic reproduction devices (e.g., copiers and printers) use a charged photoconductor that is selectively discharged by the operation of a print or imaging station, to provide an electrostatic latent image on the photoconductor's surface. Selective discharging is performed using light to which the photoconductor is sensitive. One prior art system uses a scanning laser beam that is modulated as it is scanned across the surface of the photoconductor. The photoconductor is discharged in areas where the laser is turned on while the photoconductor remains charged in areas when the laser is turned off.

A visual image, corresponding to the latent image on the photoconductor, is then printed onto the surface of a substrate material (e.g., a sheet of paper). The printing is achieved by first applying charged toner to the photoconductor and then transferring the toner to the substrate surface. The toner is transferred by placing, on the back side of the substrate, a charge that is of opposite polarity to the charge on the toner. When the substrate is placed in contact with the photoconductor and is then subsequently removed, the toner is attracted to the substrate surface resulting in the transfer of the latent image.

In electrographic reproduction devices, the area on the photoconductor that is exposed to the laser is referred to as a picture element (PEL). One scan of the laser beam across the photoconductor forms a PEL row of the latent image. The first PEL must be aligned in order for the PEL row to come out in a straight line all the way across the photoconductor. In addition, the phase of the laser beam must be controlled during each scan pass across the photoconductor such that the PELs of the current scanned row will line up with the corresponding PELs of subsequently scanned rows. In this way, parallel PEL columns are formed resulting in a uniform image being displayed. Many factors contribute to the misalignment of PEL rows including improper initialization of the first PEL and beam speed.

One prior art system uses a beam detect diode in a photodetector to facilitate proper alignment of the PEL rows. The scanning laser beam is split and when the split beam is swept across the diode, a beam detect pulse is triggered. Each time the laser is scanned across the photoconductor, the pulse is triggered at the same location. An oscillator and a phase alignment block is then used to align the start of the PEL rows with the leading edge of the beam detect pulse. The oscillator signal frequency is set such that one cycle of the oscillator signal corresponds to the length of a PEL in a scan row.

One prior art system accomplishes this alignment using a phase lock loop (PLL) circuit. The beam detect pulse is input to the PLL and used to synchronize an internal oscillator. An output signal is generated that is aligned with the beam detect pulse. The PEL rows are then aligned using the output signal of the PLL. However, it can be difficult to precisely synchronize the oscillator signal with the beam detect pulse. Any phase offset variation between oscillator signal and the beam detect pulse results in what is known as jitter. One problem with such a system is that PLLs may allow for substantial jitter resulting in PEL alignment inaccuracies.

Another prior art system uses multi-tap delay lines to align the PEL rows with the beam detect pulse. In this type of system, an oscillator is used to generate a signal that is offset by a multi-tap delay block. A first delay tap receives the oscillator signal and delays it by a fixed amount (e.g., 1 to 2 nanoseconds) with each successive tap delaying the oscillator signal by an integer multiple of that fixed amount. The beam detect pulse is then compared against the delay taps to determine which one of the delay taps is nearest to the edge of the output signal. One problem with such a system is that it requires the use of multiple taps to obtain a fine resolution to completely span one full oscillator pulse. The fewer the number of taps that are used, the greater the resulting jitter. For example, if a PEL clock period is 30 nanoseconds (ns) and 10 taps (1 ns per tap) are used, then there would only be 10 positions within the 30 ns window from which to choose. As a result, approximately 3 ns of jitter may result in this example. In general, the delay spread completely covers the pel clock period.

SUMMARY OF THE INVENTION

The present invention provides a method for signal phase alignment that may include producing a pulse, producing a reference clock signal having a first frequency, generating an alignment clock signal, having the first frequency, aligned with the pulse, and realigning the first frequency of the alignment clock signal with the pulse.

In one embodiment, realigning the first frequency may include producing a plurality of delayed clock signals based on the reference clock signal, each of the plurality of delayed clock signals having one or more edges, latching the plurality of delayed clock signals based on the pulse, and selecting one of the plurality of delayed clock signals having an edge nearest to the pulse.

In another embodiment, the alignment clock signal may have one or more edges. The signal phase alignment method may further include adjusting the pulse based on the latched plurality of delayed clock signals, entering one of the edges of the alignment clock signal within the edges of the plurality of delayed clock signals, and selecting one of the plurality of delayed clock signals having an edge nearest to the adjusted pulse.

In another embodiment, the reference clock signal has one or more clock edges and the pulse has a pulse edge. Generating an alignment clock signal includes receiving the pulse; and aligning one of the clock edges of the reference clock signal with the pulse edge.

In yet another embodiment, the present invention provides a phase alignment circuit including a signal generator and a signal realignor. The signal generator and the signal realignor further include a pulse, a reference clock signal, a phase lock loop, a multi tap delay, and a latch bank. The phase locked loop may have a first input that may be coupled to receive the pulse, a second input that may be coupled to receive the reference clock signal and an output. The multi tap delay may have an input that may be coupled to the output of the phase locked loop and a plurality of outputs. The latch bank may have a plurality of inputs coupled to receive the pulse and a plurality of outputs.

In yet another embodiment, the phase alignment circuit may also include a combination logic and a control logic. The combination logic may be coupled to receive the plurality of outputs of the multi tap delay and may be coupled to receive the plurality of outputs of the latch bank. The combination logic may have a clock output and a range output. The control logic may be coupled to receive the range of output of the combination logic and may have an output to adjust the pulse received by the latch bank based on the range output of the combination logic.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A illustrates a table of latched outputs of a latch bank with corresponding range outputs.

FIG. 5B illustrates a table of range outputs of a combination logic block.

FIG. 5C illustrates a table of multiple scan range outputs.

DETAILED DESCRIPTION

A multistage oscillator phase alignment scheme is described. In the following description, numerous specific details are set forth such as examples of specific circuits, components, processes, etc. in order to provide a thorough understanding of the present invention. It should be appreciated, however, that these specific details need not be employed to practice the present invention. In other instances, well known structures and circuits have not been described in detail in order to avoid unnecessarily obscuring the present invention.

Figure 1:
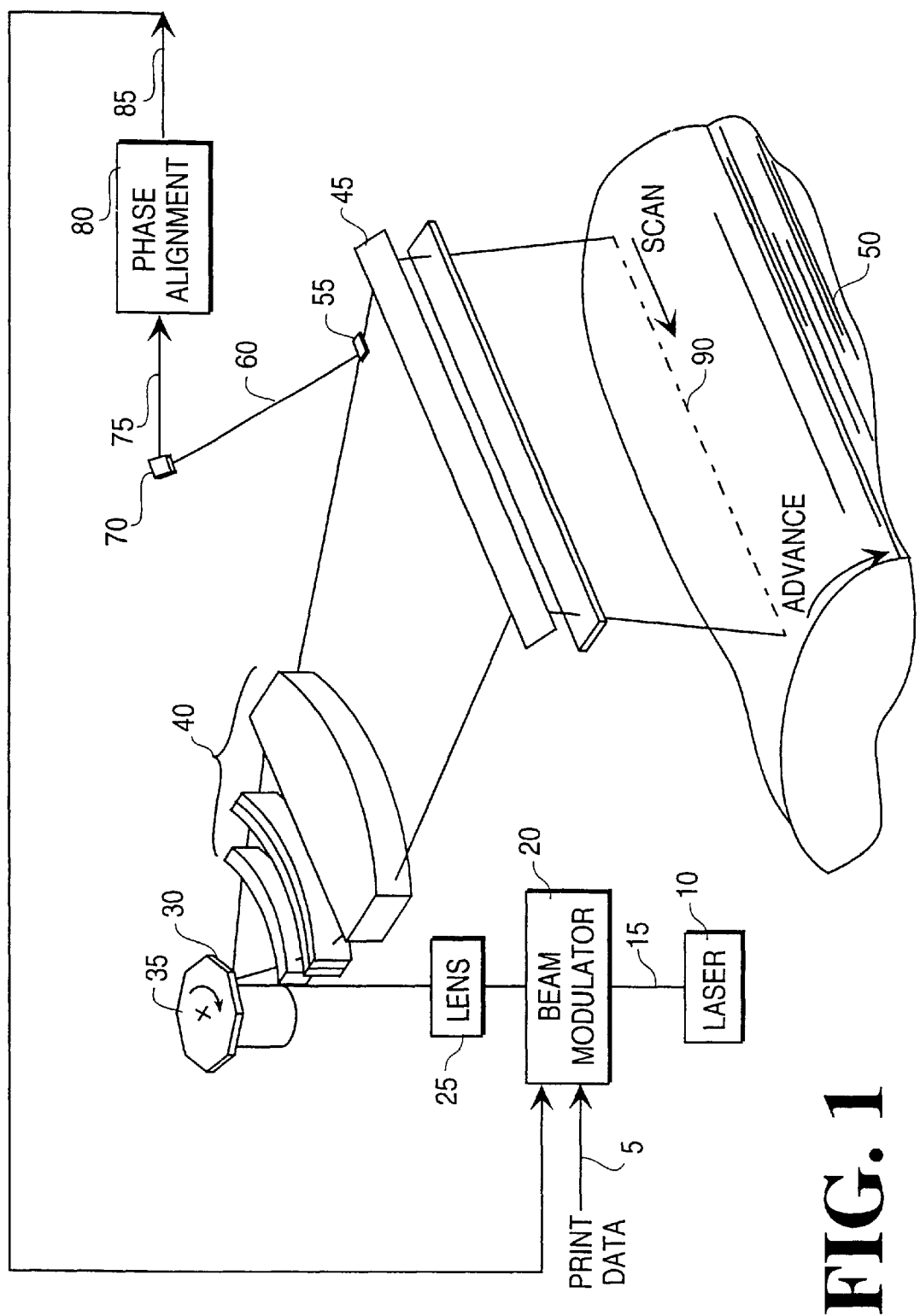
FIG. 1 illustrates an optical scanning system that contains a phase alignment circuit configured in accordance with one embodiment of the present invention.
Figure 2:
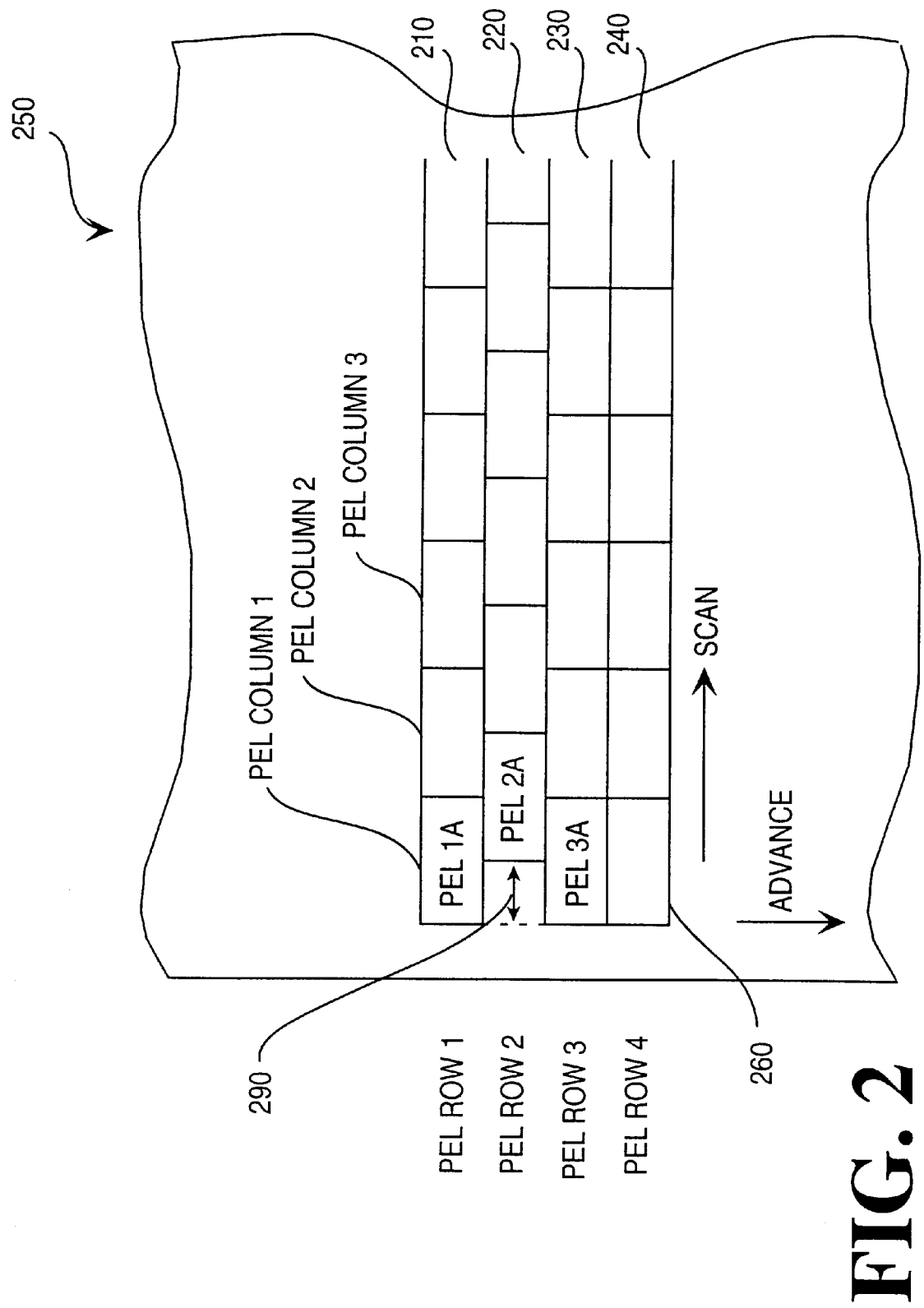
FIG. 2 illustrates PEL row generation on a photoconductor.

FIG. 1 illustrates an optical scanning system that contains a phase alignment block configured in accordance with one embodiment of the present invention. Laser 10 generates a laser beam 15 that is modulated by beam modulator 20. Beam 15 is passed through a lens 25 for focusing beam 15 onto facets 30 of a rotating mirror 35. Beam 15 is reflected from the rotating mirror 35 through a lens group 40 to a fold mirror 45 and then reflected onto the surface of a photoconductor 50. Beam 15 is split at reflective surface 55 which operates to reflect the split beam 60 to a photodetector 70. Photodetector 70 generates a beam detect pulse (BDP) 75 indicating the start of a scan. The BDP 75 is provided to phase alignment block 80 which generates a PEL clock signal 85 based on BDP 75. The PEL clock signal 85 is provided to the beam modulator 20. It should be noted that the multistage oscillator phase alignment scheme described herein may also be used in multiple beam printer systems in which two or more PEL rows are printed approximately simultaneously, FIG. 2 illustrates PEL rows generated on a photoconductor. As the laser beam 15 of FIG. 1 is scanned across photoconductor 250, a first PEL row 210 of latent image data is created on the surface of photoconductor 250. The print data 5 of FIG. 1 operates to control beam modulator 20 of FIG. 1 to turn on and off for each PEL that is to be created on photoconductor 250. Without phase alignment, when the laser beam is subsequently scanned across the photoconductor, the second PEL row 220 may have an offset 290 with respect to first PEL row 210. As such, the phase of beam modulator 20 of FIG. 1 must be aligned during each scanned row such that the PELs of one scanned row will align with the corresponding PELs of a subsequent scanned row as shown for the third and fourth PEL rows 230 and 240. The phase alignment is accomplished with phase alignment block 80.

Figure 3A:
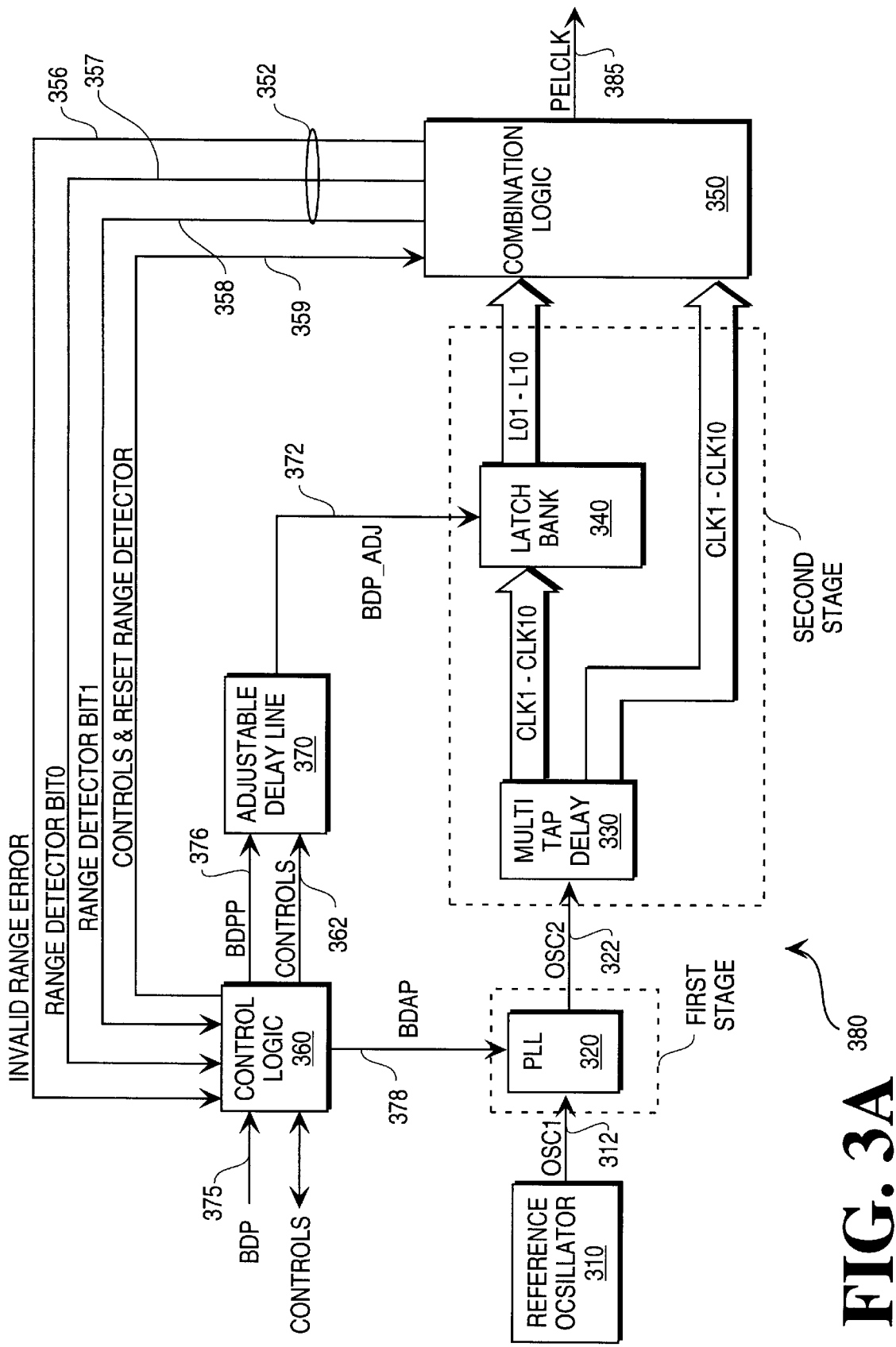
FIG. 3A illustrates one embodiment of the phase alignment block.

FIG. 3A illustrates one embodiment of the phase alignment block. The illustrated embodiment uses only a two stage alignment scheme. However, for other embodiments, additional stages may be used to further refine the alignment of a picture element clock with a beam detect pulse.

Phase alignment block 380 contains reference oscillator 310, PLL 320, multi-tap delay 320, latch bank 340, combination logic 350, control logic 360, and adjustable delay line 370. BDP 375 is received from photodetector 70 of FIG. 1 by control logic 360. Control logic 360 generates beam detect alignment pulse (BDAP) 378 and beam detect pulse prime (BDPP) 376 and transmits signal 378 to PLL 320. Reference oscillator 310 outputs a reference clock signal (OSC1) 312 to PLL 320. BDAP 378 is a pulse generated from BDP 375 having a reference edge with the minimum pulse width and polarity for use with PLL 320. In one embodiment, control logic 360 uses the A447-0250-10 10 tap delay sold by Bel Fuse, Inc. to generate BDAP 378. For other embodiments, other generally commercially available delays can be used. It should be noted that multi-tap delays are well known to those skilled in the art and, therefore, the details are not described herein.

For the embodiment illustrated in FIG. 3A, the first stage of the alignment scheme contains a PLL. The PLL 320 receives OSC1 312 and BDAP 378, and generates an alignment clock signal OSC2 322. OSC2 322 has a frequency that may be based on a multiple of the frequency of OSC1 312 and an output phase approximately aligned with BDAP 378. In one embodiment, alignment clock signal 322 has the same frequency as reference clock signal 312. It should be noted that PLLs are well known to those skilled in the art and, therefore, the details are not described herein. In one embodiment, the ICS 1574 (sold by Integrated Circuit Devices, Inc.) is used for PLL 320. For ICS 1574, OSC2= (N/M)×OSC1 where N and M are programmable values within the PLL. For other embodiments, other PLLs that are generally commercially available can be used. In another embodiment, illustrated in FIG. 3B, PLL 320 in the first stage is replaced by a multi-tap delay line with logic to select one of the delay signals that is closest in phase to the beam detect alignment pulse 378.

Figure 4A:
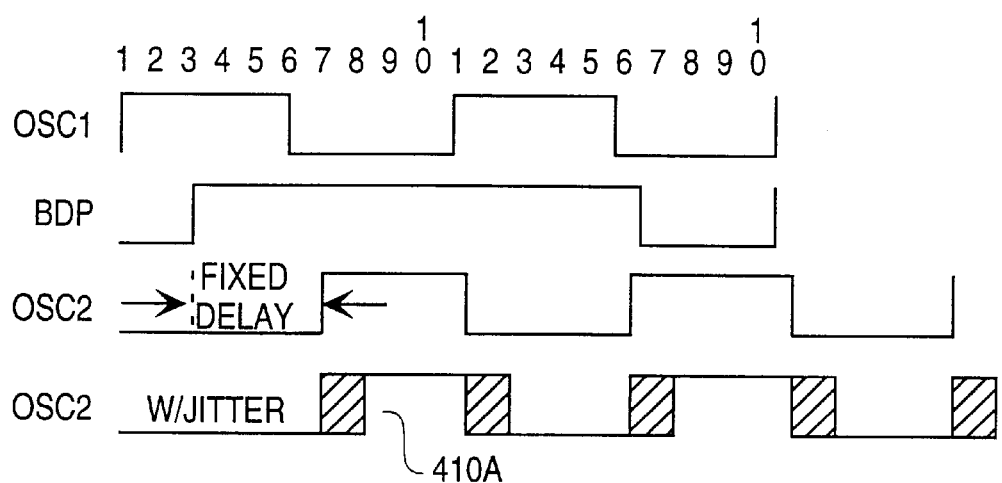
FIG. 4A illustrates a timing diagram for first stage signals for one embodiment of the phase alignment block.
Figure 4B:
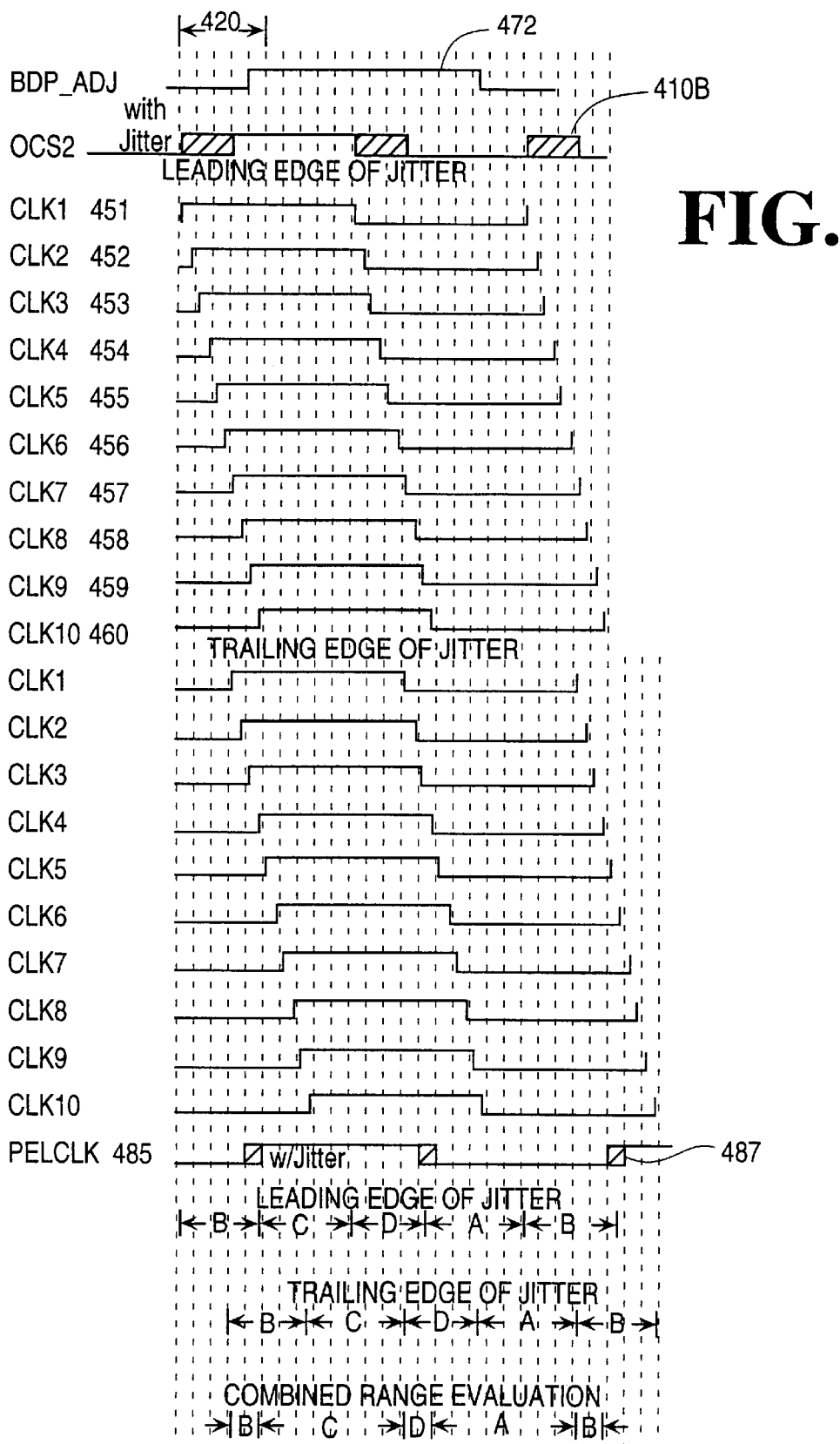
FIG. 4B illustrates a timing diagram for second stage signals for one embodiment of phase alignment block.

In the second stage of the embodiment illustrated in FIG. 3A, the alignment clock signal 322 is used by multi-tap delay 330 to generate delayed signals. A first delay tap receives OSC2 322 and delays it by a fixed amount (e.g., 1 to 2 ns) with each successive tap delaying OSC2 322 by a multiple of that fixed amount. However, on each successive scan the OSC1 312 signal may be out of alignment with the beam detect pulse such that a different delay tap is selected to align the alignment clock signal with the beam detect pulse. This misalignment may result because the length of a PEL row is not an even multiple of the time that it takes for the scan beam to return to the first PEL column after completion of a scan row. The resulting phase difference between the earlier selected tap and the later selected tap results in jitter 410A and 410B as shown in FIGS. 4A and 4B, respectively. The minimum jitter created by the PLL can be typically 20% of one pulse of the oscillator signal.

For the embodiment illustrated in FIG. 3A, multi-tap delay 330 is a 10 tap delay (available from Bel Fuse, Inc.). For another embodiments, tap delay block has fewer than 10 taps. For yet another embodiment, the delay block has more than 10 taps. It is desirable, however, to use a multi-tap delay with enough taps to completely cover the jitter coming out of the first stage. The multi-tap delays have a first delay tap with an indeterminate delay and successive taps separate by a fixed delay.

Figure 3B:
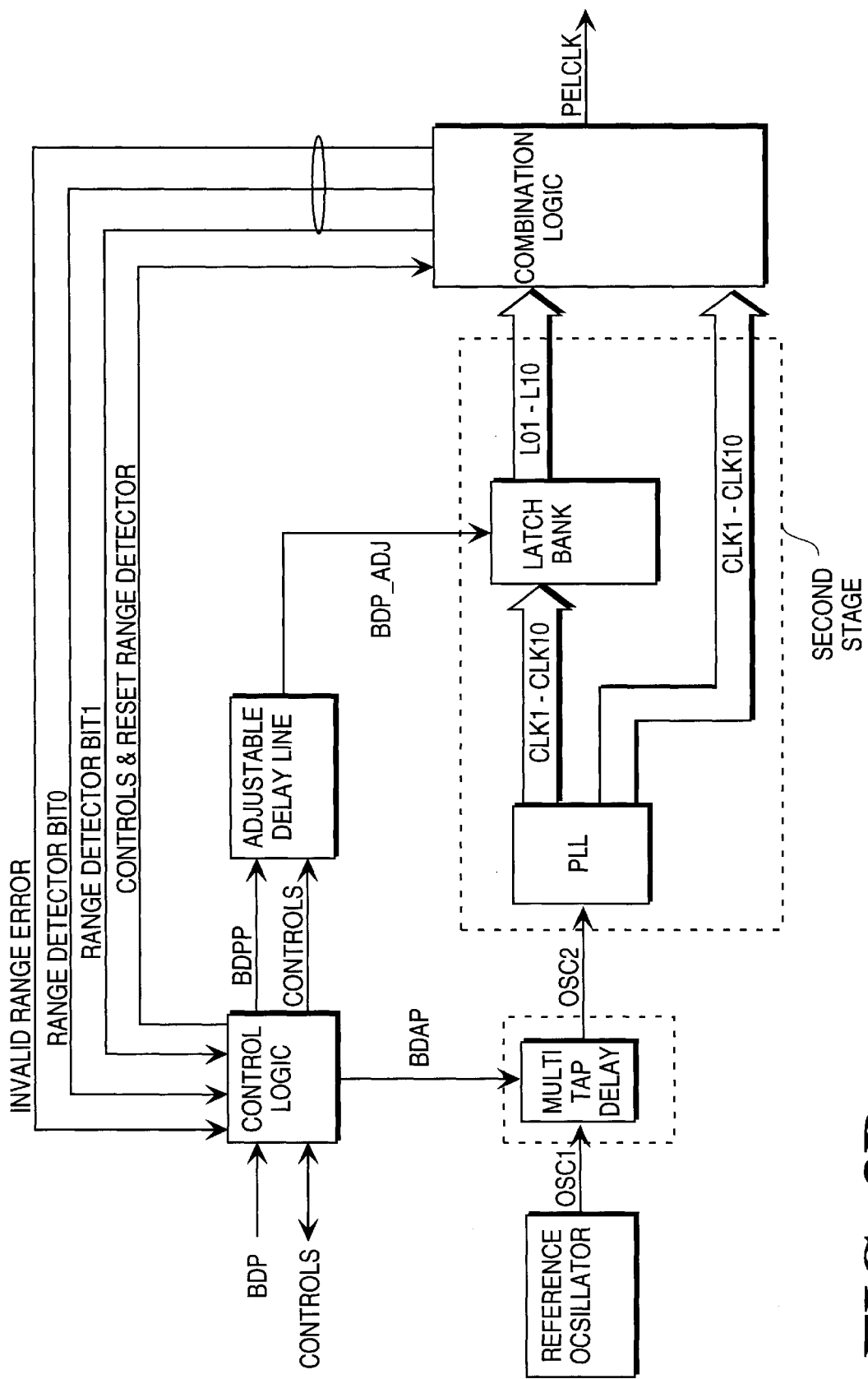
FIG. 3B illustrates an alternative embodiment of a phase alignment block.

In another embodiment, illustrates in FIG. 3B, the multi-tap delay in the second stage is replaced with a PLL. However, a multi-tap delay is desirable in the second stage because a finer resolution is easier to achieve with a tap delay than with a PLL.

The outputs, CLK1–CLK10, of multi-tap delay 330 are coupled to a latch bank 340 and combination logic 350. Latch bank 340 is made up of a bank of ten latches where the phase of the signals coming out of the multi-tap delay lines are latched based on an adjustable beam detect signal 372 (BDP_ADJ). BDP_ADJ 372 is used to move the scan line up or down the print row in fine increments, for example 1 or 2 ns steps, as discussed in further detail below. This adjustment is then set for subsequent scan lines. The outputs, L01–L10, of latch bank 340 are binary latch signals corresponding to CLK1–CLK10, respectively. L01–L10 and CLK1–CLK10 are coupled to combination logic 350.

Combination logic 350 uses binary output signals L01–L10 to determine which of the tap delay signals, CLK1–CLK10, is nearest to the beam detect alignment pulse BDAP 378. In one embodiment, the tap delay signal with the nearest preceding edge to signal 378 is then output as the picture element clock (PELCLK) 385. In an alternative embodiment, the PELCLK is selected based on a comparison of signal 378 to the nearest succeeding edge of CLK1–CLK10. Range detection bits 352 are generating indicating the state of CLK1–CLK10 with 11, 00, 01, and 10 corresponding to an indication of being within the target range, outside the target range, late, and early, respectively, as illustrated in FIG. 5B. Range detection bits 352 are transmitted to control logic 360 to adjust BDP_ADJ 372 in order to obtain a 11 value on range detection bits 352. In one embodiment, combination logic 350 is implemented as a programmable logic array. In another embodiment, combination logic 350 is implemented as a programmable lookup table.

The multi stage alignment scheme enables the generation of a better picture element clock, over single stage schemes, because the PLL and the BDP of the first stage generate a more accurate alignment clock signal, OSC2, for the second stage. This allows the second stage to assume that the jitter (i.e., phase alignment error) is within the bounds of the second multi tap delay line range of delays. The alignment scheme shown in FIG. 3A has been illustrated with two alignment stages. In other embodiments, however, additional stages may be used to further refine the alignment of the picture element clock with the beam detect pulse. With additional stages, the limited jitter of a prior stage can be used to focus the jitter of a subsequent stage.

Referring still to FIG. 3A, control logic 360 receives range outputs 352 from combination logic 350 and outputs control signals 362 to adjustable delay line 370. Control signals 362 include 6 bits which select 1 of 64 ($2^6$) delay values (e.g., 000000=X delay+0 ns, 000001=X delay+2 ns) of adjustable delay line 370. In one embodiment, the 0449-0141-06 (2 ns/step adjustable delay sold by Bel Fuse, Inc.) is used for adjustable delay line 370. For other embodiments, other adjustable delay lines that are generally commercially available can be used. Furthermore, adjustable delay lines having different step increments (e.g., 1 ns/step) may also be used. The adjustable delay line 370 generating BDP_ADJ 372 is used to compensate for the use of different delay components in the logic blocks as well as to adjust for PEL clock frequency changes in printer systems that allow the adjustment of printer speed and PEL resolution. The adjustable delay selected should have a delay sufficient to span the longest supported PEL clock cycle time with steps small enough so that the jitter from the first stage can be centered in the target range. In one embodiment, the PEL clock cycle time varies from approximately 10 to 80 ns. To allow for the jitter to fall within the target range, the span of the adjustable delay may be split, for example, in 1/20 PEL steps.

The feedback path that is created is used to adjust OSC2 such that it overlaps the transition region of CLK1–CLK10 if the jitter is outside of the range of CLK1–CLK10. The transition region of CLK1–CLK10 is the region from the rising edge of CLK1 to the rising edge of CLK10. The transition region of the second stage must overlap the entire jitter pattern out of the first stage in order to properly align PELCLK 385 with the beam detect pulse 375. The control logic 360 operates to increase or decrease the delay until the signals CLK1–CLK10 are matched up with the oscillator signal. In one embodiment, control logic 360 is implemented as a counter where all possible range values are evaluated until the target value is identified.

The range outputs 352 of combination logic 350 includes a range detect bit 0 357, a range detect bit 1 358, and an invalid range error 357. Combination logic 350 also receives an input 359 from control logic 360 that is used to reset the accumulated range detection of the latched input signals of combination logic 350.

FIG. 5A illustrates a table of latched outputs of latch bank 340 of FIG. 3A with corresponding range outputs. When all the latched outputs are a logic 0 (indicated as A), then combination logic outputs a 00 to the control logic, indicating that all the rising edges of CLK1–CLK10 are outside the target range, and outputs CLK1 as the PELCLK. When one of the latched outputs is a logic 1, then the combination logic outputs a 11 to the control logic indicating that one of the rising edges of CLK1–CLK10 is within the target range. In addition, the combination logic outputs the CLK having its rising edge nearest the beam detect pulse as the PELCLK. When all the latched outputs have switched states indicating that all rising edges have passed (the latched outputs switch to a logic 0), then combination logic outputs a 00 to the control logic indicating that none of the rising edges are within the target range. CLK1 is output as the PELCLK as the default clock selection. All states select at least one clock (CLK1) to prevent shutdown of other logic in the phase alignment block. In another embodiment, multiple scans are monitored and accumulated such that a mix of outputs are evaluated to adjust PELCLK within the target range as illustrated in FIG. 5C.

FIGS. 4A and 4B illustrate timing diagrams for one embodiment of phase alignment block 380 of FIG. 3A. As shown in FIG. 4A, the PLL 320 attempts to generate OSC2 having a frequency based on OSC1 and a rising edge aligned with a fixed delay. The resulting OSC2 signal has a fixed delay relative to the beam detect pulse (BDP). Signal OSC2, however, may have some jitter 410A associated with it. One of the delay taps in the multi-tap delay block is then used to refine the alignment of OSC2 with the beam detect pulse as further shown in FIG. 4B. The BDP_ADJ signal 472 used to center the OSC2 jitter 410B within window 420 of the rising edges of CLK1–CLK10 451–460, respectively. Window 420 is the target range B when the leading edges of CLK1–CLK10 are used for alignment.

Feedback from the combination logic 350 of FIG. 3A is used to adjust the delay in order to align the target range B by moving the beam detect pulse so that it remains in the target range despite OSC2 jitter. Each beam detection is either within the target range B of the combination logic, outside the target range, D, or partially within the target range on one side or the other, C or A. These four states are combined for multiple PEL scans such that the combination logic feedback allows controls 362 of FIG. 3A to move the BDP_ADJ 472 until centering of the first stage jitter 410B within the target range is achieved. This multistage feedback scheme produces PELCLK 485 with jitter 487 that is less than the first stage jitter 410B.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of signal phase alignment, comprising:
   producing a pulse;
   producing a reference clock signal having a first frequency;
   generating an alignment clock signal having the first frequency, the alignment clock signal of the first frequency aligned with the pulse;
   producing a plurality of delayed clock signals based on the alignment clock signal, each of the plurality of delayed clock signals having one or more edges;
   latching the plurality of delayed clock signals based on the pulse; and
   selecting one of the plurality of delayed clock signals having an edge nearest to the pulse.

2. The method of claim 1, wherein the alignment clock signal has one or more edges and wherein the method further comprises:
   adjusting the pulse based on the latched plurality of delayed clock signals;
   centering one of the edges of the alignment clock signal within the edges of the plurality of delayed clock signals; and
   selecting one of the plurality of delayed clock signals having an edge nearest to the adjusted pulse.

3. The method of claim 1, wherein the plurality of delayed clock signals comprises a first delay tap with an indeterminate delay and successive taps separated by a fixed delay.

4. The method of claim 1, wherein the reference clock signal has one or more clock edges, wherein the pulse has a pulse edge, and wherein generating an alignment clock signal comprises:
   receiving the pulse; and
   aligning one of the clock edges of the reference clock signal with the pulse edge.

5. A method of signal phase alignment, comprising:
   producing a reference clock signal having a first frequency with one or more edges;
   producing a pulse having a pulse edge;
   generating an alignment clock signal by aligning one of the edges of the reference clock with the pulse edge;
   producing a plurality of delayed clock signals based on the aligned clock signal, the plurality of delayed clock signals having delayed clock edges;
   latching the plurality of delayed clock signals based on the pulse;
   selecting one of the plurality of delayed clock signals having a delayed clock edge nearest to the pulse edge;
   adjusting the pulse based on the latched plurality of delayed clock signals;
   centering one of the edges of the alignment clock signal within the edges of the plurality of delayed clock signals; and
   selecting one of the plurality of delayed clock signals having an edge nearest to the adjusted pulse.

6. A phase alignment circuit, comprising:
   a phase locked loop having a first input coupled to receive a pulse, a second input coupled to receive a reference clock signal, and an output, the phase locked loop to generate an alignment clock signal based on the reference clock signal, the alignment clock signal having a frequency aligned with the pulse; and
   a signal realignor to realign the alignment clock signal with the pulse.

7. The phase alignment circuit of claim 6, wherein the signal realignor comprises:
   a multi tap delay having an input coupled to the output of the phase locked loop and a plurality of outputs; and
   a latch bank having a plurality of inputs coupled the plurality of outputs of the multi tap delay, an input coupled to receive the pulse, and a plurality of outputs.

8. The phase alignment circuit of claim 7, wherein the signal realignor further comprises:
   a combination logic coupled to receive the plurality of outputs of the multi tap delay and to receive the plurality of outputs of the latch bank, the combination logic having a clock output and a range output; and
   a control logic coupled to receive the range output of the combination logic, the control logic having an output to adjust the pulse received by the latch bank based on the range output of the combination logic.

9. A printer system comprising the phase alignment circuit of 8, wherein the printer system comprises:
   a beam modulator;
   an oscillator to generate the reference clock signal; and
   a photodetector to generate the pulse.

10. The phase alignment circuit of claim 7, wherein the multi tap delay is a 10 tap delay.

11. A phase alignment circuit, comprising:
   a signal generator to generate an alignment clock signal based on a reference clock signal, the alignment clock signal having a frequency aligned with a pulse; and
   a signal realignor to realign the alignment clock signal with the pulse, the signal realignor comprising:
     a multi tap delay having a first input coupled to receive the reference clock signal, a second input coupled to receive the pulse, and a plurality of outputs; and
     a latch bank having a plurality of signal inputs coupled the plurality of outputs of the multi tap delay, a control input coupled to receive the pulse, and an output; and a phase locked loop having an input coupled to receive one of the plurality of outputs of the multi tap delay, a control input coupled to receive the pulse.

12. The phase alignment circuit of claim 11, wherein the multi tap delay is a 10 tap delay.

13. A phase alignment circuit, comprising:
    means for producing a pulse;
    means for producing a reference clock signal having a first frequency;
    means for generating an alignment clock signal having the first frequency, the alignment clock signal of the first frequency aligned with the pulse;
    means for realigning the alignment clock signal of the first frequency with the pulse wherein the means for realigning comprises:
        means for producing a plurality of delayed clock signals based on the alignment clock signal, each of the plurality of delayed clock signals having one or more edges;
        means for latching the plurality of delayed clock signals based on the pulse; and
        means for selecting one of the plurality of delayed clock signals having an edge nearest to the pulse.

14. The phase alignment circuit of claim 13, wherein the alignment clock signal has one or more edges and wherein the method further comprises:
    means for adjusting the pulse based on the latched plurality of delayed clock signals;
    means for centering one of the edges of the alignment clock signal within the edges of the plurality of delayed clock signals; and
    means for selecting one of the plurality of delayed clock signals having an edge nearest to the adjusted pulse.

* * * * *